United States Patent [19]

Lorvig et al.

[11] Patent Number: 5,574,861
[45] Date of Patent: Nov. 12, 1996

[54] DYNAMIC ALLOCATION OF B-CHANNELS IN ISDN

[76] Inventors: Don Lorvig; Paul Lew, both of 5 Manor Pkwy., Salem, N.H. 03079; Paul Cummings, 53 Lawndale St., Belmont, Mass. 02178

[21] Appl. No.: 539,251

[22] Filed: Oct. 5, 1995

Related U.S. Application Data

[63] Continuation of Ser. No. 94,114, Dec. 21, 1993, abandoned.

[51] Int. Cl.$^6$ .............................. H01J 13/00; H04J 3/12; H04J 3/24
[52] U.S. Cl. ....................... 395/200.06; 395/200.11; 395/200.12; 395/200.2; 364/DIG. 1; 364/241.9; 370/110.1; 370/94.1
[58] Field of Search ..................... 370/60, 60.1, 94.1, 370/13, 16; 395/200.13, 200.17, 200.2

[56] References Cited

U.S. PATENT DOCUMENTS

| | | | |
|---|---|---|---|
| 4,663,748 | 5/1987 | Karbowiak | 370/89 |
| 4,700,341 | 10/1987 | Huang | 370/80 |
| 4,789,981 | 12/1988 | Yanosy et al. | 370/58.1 |
| 4,805,167 | 2/1989 | Leslie et al. | 370/84 |
| 4,821,264 | 4/1989 | Kim | 370/110.1 |
| 4,821,265 | 4/1989 | Albal et al. | 370/110.1 |
| 4,866,703 | 9/1989 | Black | 370/60 |
| 4,885,739 | 12/1989 | Read et al. | 370/58.1 |
| 4,930,123 | 5/1990 | Shimizu | 370/94 |
| 4,965,790 | 10/1990 | Nishino et al. | 370/85.12 |
| 4,972,183 | 11/1990 | Kuhlmann et al. | 340/825.22 |
| 4,993,017 | 2/1991 | Bachinger | 370/58.2 |
| 4,996,685 | 2/1991 | Farese et al. | 370/58.1 |
| 5,014,265 | 5/1991 | Hahne | 370/60 |
| 5,081,671 | 1/1992 | Raith et al. | 379/60 |
| 5,164,938 | 11/1992 | Jurkevich et al. | 370/60 |
| 5,184,348 | 2/1993 | Abdelmouttalib et al. | 370/95.1 |
| 5,208,811 | 5/1993 | Kashio et al. | 370/94.1 |
| 5,224,099 | 6/1993 | Corbalis et al. | 370/94.2 |
| 5,282,202 | 1/1994 | Bernstein et al. | 370/94.1 |
| 5,313,454 | 5/1994 | Bustini et al. | 370/13 |
| 5,317,562 | 5/1994 | Nardin et al. | 370/16 |
| 5,327,428 | 7/1994 | Van As et al. | 370/94.2 |
| 5,442,630 | 8/1995 | Gagliardi et al. | 370/85.13 |
| 5,444,703 | 8/1995 | Gagliardi et al. | 370/60.1 |
| 5,463,629 | 10/1995 | Ko | 370/110.1 |
| 5,479,407 | 12/1995 | Ko et al. | 370/94.1 |

OTHER PUBLICATIONS

Ohrui, "The Dex–Ctron Operating System Applicable to ISDN Switching and Communications Processing Systems", IEEE (1988), pp. 1395–1399.
Butscher et al., "A Protocol Architecture for Transport Services in B–ISDN," IEEE (1990), pp. 428–434.
Lai, "An Advanced Overview of the XIS Architecture", IEEE (1990), pp. 625–633.
Imai et al., "ATMR: Ring Architecture for Broadband Networks", IEEE (1990), pp. 1734–1738.
Ujihashi et al., "An Architecture for Connectionless Data Service in B–ISDN", IEEE (1990), pp. 1739–1743.
Data & Computer Communications, Stallings, 1988, pp. 595–600.

*Primary Examiner*—Alyssa H. Bowler
*Assistant Examiner*—Krishna Malyala
*Attorney, Agent, or Firm*—Lowe, Price, LeBlanc & Becker

[57] ABSTRACT

An implementation of an ISDN router enables computers interconnected to each other and to the ISDN to share resources by issuing operating system commands. One computer can access a storage disk or other resource of another computer distributed at any terminal location on the ISDN. Each disk on the Network has a unique name by which it is accessed. The configuration of the Network and number of computers distributed on it are transparent to each user. To improve bandwidth utilization of the ISDN line while sharing terminal resources, a B-channel allocation algorithm executed by routers between the terminals and the ISDN line dynamically allocates bandwidth by monitoring traffic at each destination queue and in response allocating or deallocating virtual B-channels. Bandwidth utilization is optimized by packaging data packets into trains that are transmitted to the destination when the train is completed and upon satisfaction of other conditions. Each train undergoes data compression by execution of a suitable compression algorithm.

30 Claims, 11 Drawing Sheets

DYNAMIC ALLOCATION OF B-CHANNELS IN ISDN

This application is a continuation of application Ser. No. 08/094,114 filed Jul. 30, 1993, now abandoned.

TECHNICAL FIELD

The invention relates generally to Integrated Services Digital Networks (ISDN), and more particularly, to accessing from one computer data and applications resident at other computers distributed on an ISDN.

BACKGROUND ART

Small computers such as "personal computers" ordinarily operate as a stand alone device, carrying out information processing based on programming and data stored locally on a floppy or hard disk or in semiconductor memory media. Data can be transferred among computers digitally by cables connected to input-output ports of the computers or to commercial telephone lines or other physical media following digital-to-analog conversion by modems. Computers also can be interconnected in a local area network (LAN), sharing common resources such as data bases, files and programming, and peripheral devices, e.g., printers. Accessing from one computer a resource of another computer on a common network is not done "transparently", i.e., a computer having a desired resource must be accessed before the resource associated with it is accessed. The user accordingly must have knowledge of the location of the resource on the Network.

For example, referring to FIG. 1, a plurality of terminals T are coupled through modems M to a network. Each terminal T comprises a personal computer PC and an optional telephone unit TEL to enable the user to carry out voice communications with other terminals on the line. The computers PC, which are controlled by a common operating system, such as MS-DOS, contain data, applications and peripheral devices, hereinafter collectively called "resources", that are accessible through operating system commands. An example is a floppy or hard disk drive unit DS residing at each computer PC.

Assume that a local computer contains two disk drive units DSA and DSB, a floppy disk drive and a hard disk drive. To copy all data stored on disk drive unit DSA to drive unit DSB, the operating system command in MS-DOS is:

copy DSA:*.* DSB:

Conventionally, the operating system enables multiple resources to be accessed by a computer. However, no sharing of resources among different computers is possible unless the computers are programmed to operate as "master-slave" units. Remote access software, such as "pcANYWHERE", by Dynamic Microprocessor Associates, Inc., is an example of commercially available software for this purpose. Resource sharing requires each computer on the Network to be loaded with, and executing, the remote accesses software.

Files can be transferred between computers using conventional file transfer software, such as "SMARTCOM", by Hayes Microcomputing, but file transfer requires operator attendance at each terminal.

The present invention is directed to a router that provides resource sharing among computers standing alone or residing in local area networks LANs without operator attendance at the "slave" terminal. Communications between computers is transparent, enabling the user to access distributed resources without knowledge of the locations of the resources on the Network.

The invention is carried out in the environment of ISDN. ISDN is a relatively newly developed and emerging field of telecommunications which integrates computer and communications technologies to provide, worldwide, a common, all-digital network. This is based, in part, on standardizing the structure of digital protocols developed by the International Telegraph and Telephone Consultative Committee (CCITT). Despite implementation of multiple networks within national boundaries, from a user's point of view there is a single, uniformly accessible, worldwide network capable of handling a broad range of telephone, data and other conventional and enhanced services. The invention, carried out on the ISDN, will enable terminal resources to be shared globally.

A complete description of the architecture of ISDN is beyond the scope of this specification. For details, and for an extensive bibliography of references of ISDN, see Stallings, ISDN: An Introduction, MacMillan Publishing Company, 1989. Copending application Ser. No. 976,923 and now U.S. Pat. No. 5,463,629, to Ko, entitled "Dynamic Channel Allocation Method and System for Integrated Services Digital Network," filed by the assignee of this invention, provides a background discussion of ISDN features that are germane to the present invention, and is incorporated herein by reference.

To establish communications between a host and the ISDN, an interface, or "relay", must be implemented to accomplish gateway functions, translating protocols used on dissimilar networks. A relay of a type termed a "bridge" forms interconnections at the data-link layer of the OSI Reference Model. A "router" functions at the network layer, and a "gateway" handles higher-level protocols.

An ISDN router, designated by R in FIG. 2, operates entirely in the digital domain, carrying out all necessary protocol conversion between the host network and ISDN. Details of the router R are given in copending application Ser. No. 094,144 and now U.S. Pat. No. 5,444,703, to Gagliardi et al., entitled "ISDN Interfacing of Personal Computers," filed by the common assignee on even date herewith and incorporated herein by reference.

Copending application Ser. No. 094,143 and now U.S. Pat. No. 5,442,630, to Gagliardi et al., entitled "ISDN Interfacing of Local Area Networks," filed on even date herewith and assigned to the common assignee, describes a router supporting interconnections among hosts on the ISDN to form a "virtual" LAN. A local area network, or LAN, provides a cluster of interconnected hosts (computers), or nodes, on a medium. Each node can communicate with every other node; the Network requires no central node or computer.

FIG. 3 depicts utilization of one type of router described in the aforementioned copending application (LAN connector) for interconnecting a number of hosts to form a virtual B-channel LAN. A variation, shown in FIG. 4, provides ISDN routers R to interconnect to LANs of a common type or of different types. In FIG. 5, a remote host H is connected to a pair of hosts residing on a LAN through first and second routers at the host and LAN branches of the ISDN. The host side router R1 is of a type described in the copending application entitled "ISDN Interfacing of Personal Computers." The LAN side router R2 in FIG. 5 is of a type described in the copending application entitled "ISDN Interfacing of Local Area Networks."

Copending application Ser. No. 094,115 and now U.S. Pat. No. 5,479,407, to Ko et al., entitled "Channel Utilization Method and System for ISDN", describes an ISDN router that dynamically allocates bandwidth by monitoring traffic at each destination queue and in response allocates or deallocates virtual B-channels. Bandwidth utilization is optimized by packaging data packets into trains that are transmitted to the destination when the train is completed and upon satisfaction of other conditions. Each train undergoes data compression by execution of a suitable compression algorithm.

Relays exist for allowing communication to an ISDN line. For example, U.S. Pat. No. 4,885,739 describes a message transport network at a central office, including gateways connected to a transport node controller or transport interchange supervisor to enable communication between internal processors. U.S. Pat. No. 4,821,265 describes a nodal architecture for a communication network including multiple processors for each node to carry out a Data Link Layer process on a D-channel message received through a bridge (termed a "gateway" in the patent). However, no prior art is known to enable ISDN users to share terminal resources, such as data storage disks, transparently from any terminal on the Network.

DISCLOSURE OF THE INVENTION

Accordingly, one object of the invention is to control access to resources distributed on an ISDN.

Another object is to enable a user at one terminal to control transparently resources distributed among other terminals on an ISDN.

A further object is to enable a user at one personal computer to access transparently a resource of another personal computer on the ISDN.

A further object is to enable a user at one terminal of an ISDN to access a data storage disk of another terminal of the ISDN using operating system commands.

Another object is to enable one computer, that either stands alone or is a node of a LTA, to access transparently a resource, such as a storage disk, of another computer.

Still another object is to provide an ISDN router enabling one computer, that either stands alone or is a node of a LTA, to access transparently a resource, such as a storage disk, of another computer via the ISDN.

Another object is to provide an ISDN router enabling one computer, that either stands alone or is a node of a LTA, to access a resource, such as a storage disk, of another computer using operating system commands.

A further object of the invention is to implement efficient bandwidth utilization while carrying out communications between computers on the ISDN to achieve the foregoing objects.

The above and other objects are satisfied in accordance with one aspect of the invention by a network comprising a plurality of computers having a common operating system, means for interfacing the computers to a common ISDN line and means for transmitting an operating system command on the ISDN line, globally to all of the computers.

Preferably, the computers incorporate resources, such as data storage disks, each having a unique name, and the operating system command transmitted globally on the ISDN line accesses by name a resource associated with one of the computers. Access to any resource available on the ISDN line is transparent to the user.

In accordance with another aspect of the invention, a network comprises a LTA of computers having a common operating system, a computer remote from the LTA and having the common operating system, and means for interfacing the remote computer and the LTA to a common ISDN line. Any operating system command by the remote computer is transmitted on the ISDN line globally to all of the computers in the LTA.

In accordance with still another aspect of the invention, resources available at any terminal are shared among terminals of multiple LTAs distributed on the ISDN. In a preferred embodiment, a network includes a first local area network LAN1 comprising computers having a common operating system, a second local area network LAN2 of computers remote from the first LAN and having the common operating system, and means for interfacing the first and second local area networks to a common ISDN line. Operating system commands on the ISDN line from one computer in the first LAN are transmitted globally to all other computers in the first and second local area networks to share terminal resources.

A further aspect of the invention involves improving bandwidth utilization of the ISDN line while sharing terminal resources. A B-channel allocation algorithm executed by routers between the terminals and the ISDN line dynamically allocates bandwidth by monitoring traffic at each destination queue and in response allocating or deallocating virtual B-channels. Bandwidth utilization is optimized by packaging data packets into trains that are transmitted to the destination when the train is completed and upon satisfaction of other conditions. Each train undergoes data compression by execution of a suitable compression algorithm.

Still other objects and advantages of the present invention will become readily apparent to those skilled in this art from the following detailed description, wherein only the preferred embodiment of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR PRACTICING THE INVENTION

1. Overview

The invention provides user transparent sharing of terminal resources through the ISDN. Resources at any terminal on the ISDN are identified by unique names. For example, each hard disk associated with every computer on the ISDN is assigned a unique volume name. The hard disk can be accessed from any computer on the ISDN line using an operating system command identifying the disk by volume name. The location of the disk on the Network is inconsequential to the user; hence, access to the disk by the user is "transparent".

Figure 1:
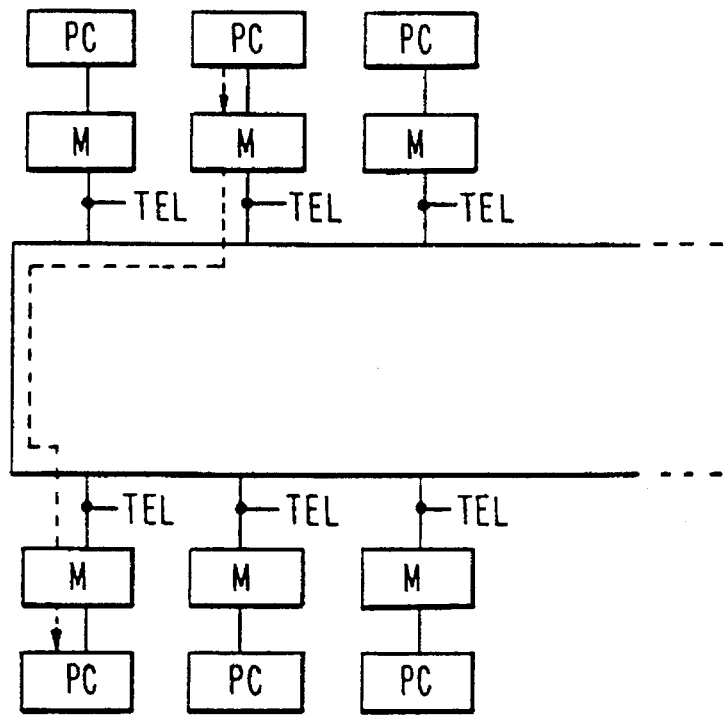
FIG. 1 is a diagram of a network of computer sharing a network in a conventional manner.
Figure 2:
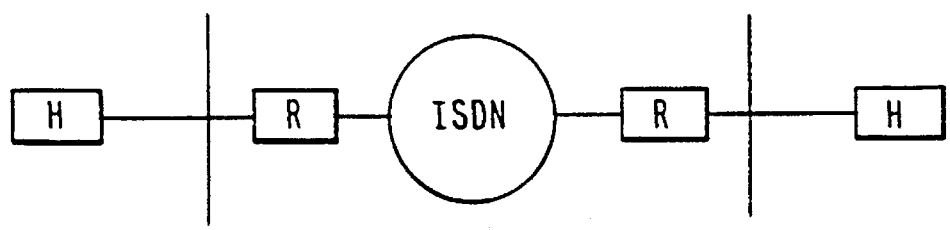
FIG. 2 is a symbolic diagram of a network implementing routers described in a copending application to interface computers to the ISDN.
Figure 3:
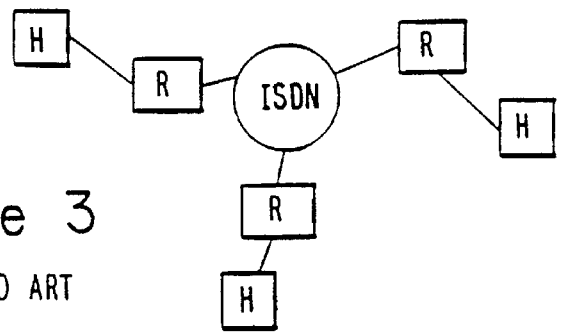
FIG. 3 is a symbolic diagram showing interconnection of multiple hosts through ISDN routers to form a virtual network, described in a copending application.
Figure 4:
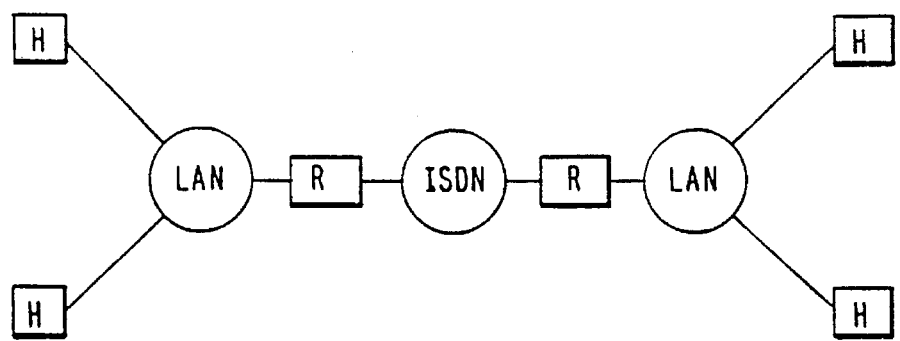
FIG. 4 is a symbolic diagram showing interconnection of LANs through ISDN routers described in another copending application.
Figure 5:
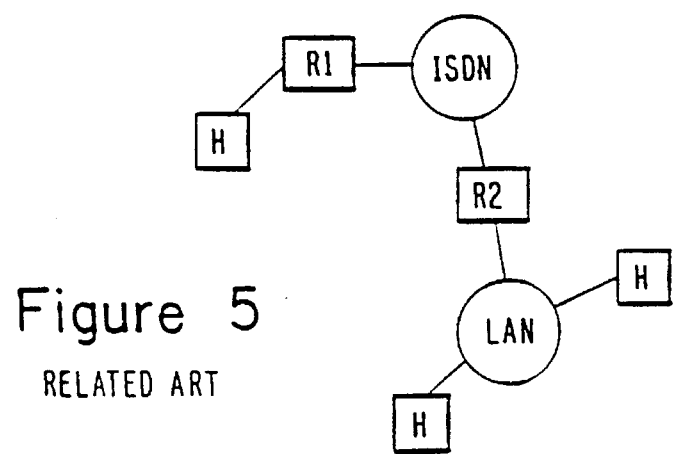
FIG. 5 is a symbolic diagram showing interconnection of a remote host to an existing LAN through ISDN routers.
Figure 6:
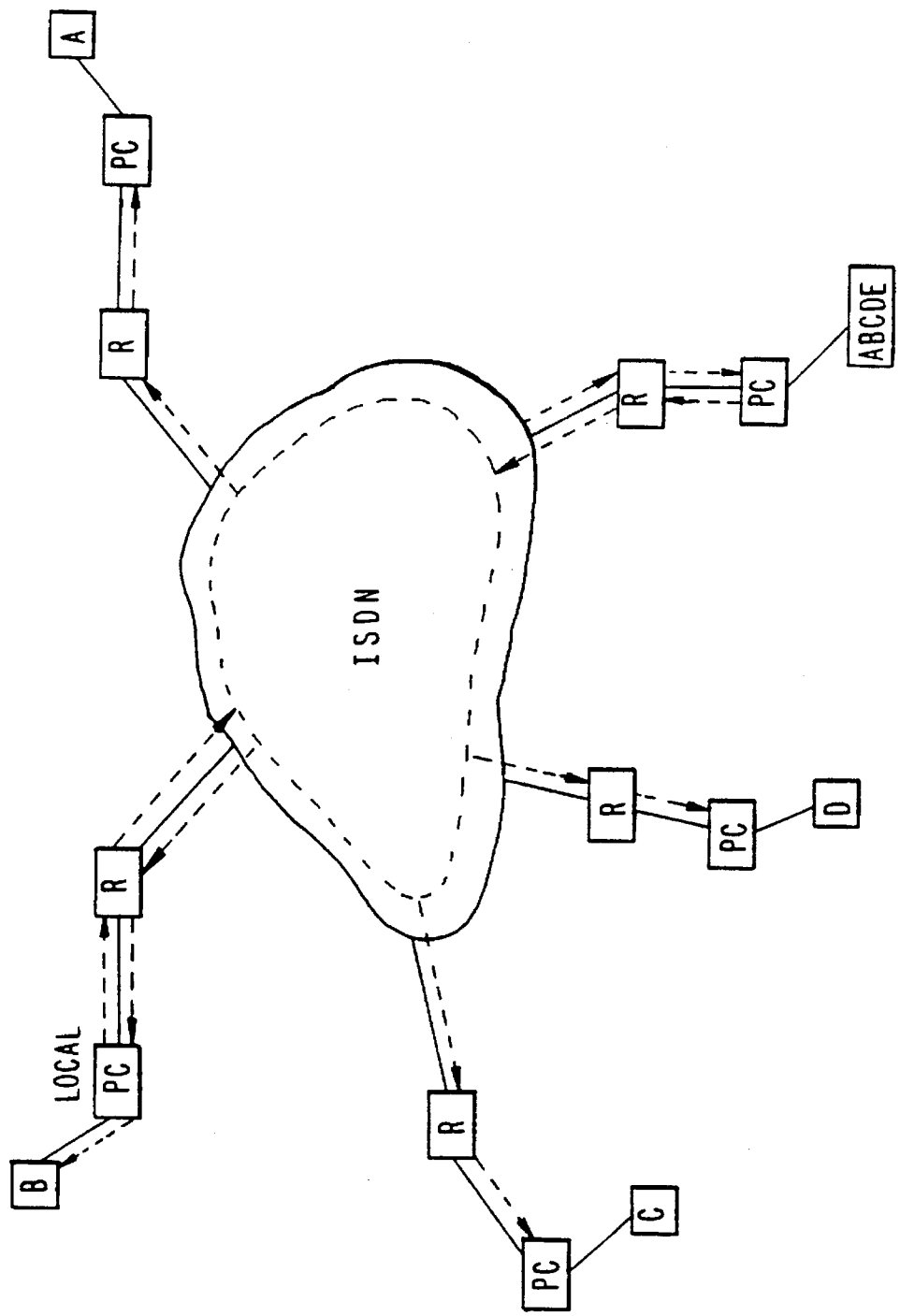
FIG. 6 is a diagram depicting resource sharing on an ISDN line in accordance with a broad aspect of the invention.

For example, assume that a disk containing data of interest resides with a computer at a remote location on the ISDN line. The disk of interest is assigned the unique volume name ABCDE, and the disk of the local computer is assigned the volume name B. The content of this disk can be copied to disk B of the local computer by applying globally to the ISDN line the following operating system command:

copy ABCDE: *.* B:

As shown in FIG. 6, the above command is applied to all terminals on the ISDN. The content only of disk ABCDE will be transferred from that disk at the corresponding remote computer through the ISDN to disk B of the local computer from which the command was executed.

Of particular importance to the process is the quality of "transparency" to the user of the local computer. That is, the user at the local computer has no prior knowledge of the location of the computer containing the desired resource; he can access the resource from any location in the world subscribing to the ISDN service and implementing the present invention, based only on the resource name and knowledge by the user of operating system commands. How this capability is implemented is described in detail hereinafter.

2. Network Architecture

Figure 7:
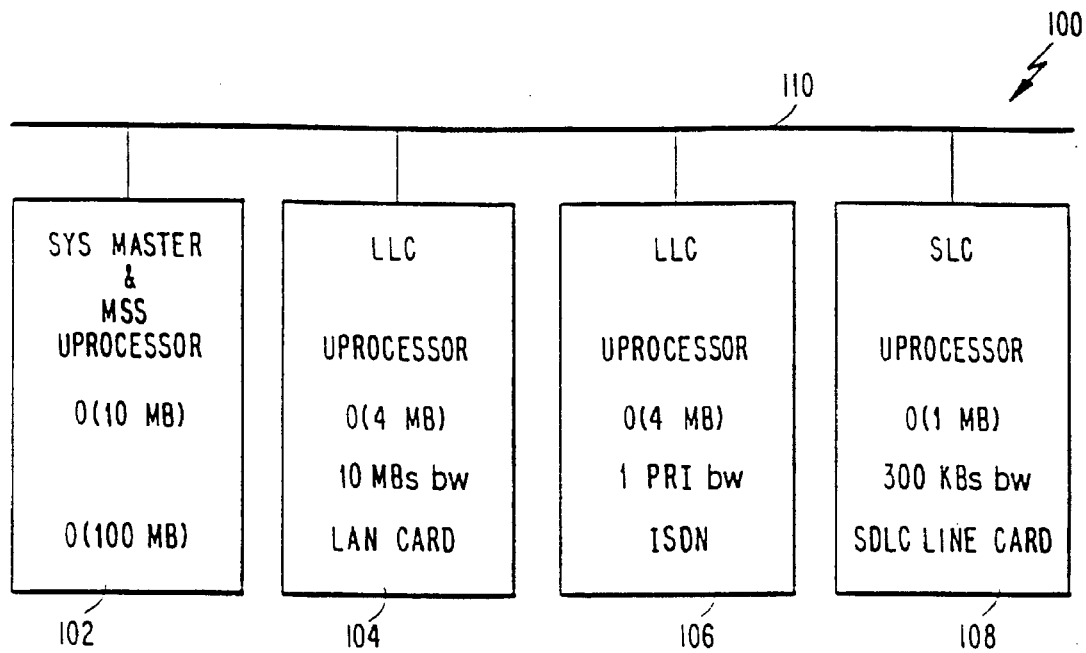
FIG. 7 is a simplified block diagram showing the hardware architecture of an ISDN router implementing resource sharing in the manner shown in FIG. 6.

Referring to FIG. 7, an ISDN gateway 100, in accordance with the invention, comprises four hardware elements 102, 104, 106, 108 interconnected by a common bus 110. The elements 102–108 preferably comprise individual circuit cards, although some or all of the elements may be incorporated in a single circuit board. The board or boards preferably reside within a personal computer but alternatively may reside outside the computer.

Element 102 is a system master which implements infrequent user functions, such as configuration management and connection requests. The system master 102 furthermore functions as a standard computing platform, emulating an IBM compatible PC or other computer standard.

LAN line card 104 implements firmware and hardware for specific IEEE 802 physical and data link protocol together with software carrying out host filtering. Different LAN line cards with corresponding protocols will be required for other LAN connections, e.g., 802.5 Token Ring and 802.3 Ethernet.

ISDN line card 106 comprises firmware and hardware implementing the ISDN physical, data link layer (LAPD), and the D-channel layer 3 protocol, and the physical layer of the B-channel. Software incorporated in the ISDN line card 106 implements train protocol and B-channel allocation algorithms as well as data compression algorithms to support a virtual broad band capability of the router, described in the copending application entitled "Dynamic Channel Allocation Method and System for Integrated Services Digital Network," incorporated herein by reference.

SDLC line card 108 includes firmware and hardware to implement the SNA physical and data link (SDLC) layers. This card is optional to the Network.

The contents of elements 102–108 are described in more detail below with reference to FIGS. 8–12. Hardware and software incorporating important aspects of the invention are integrated in ISDN line card 106.

3. Software Architecture

Figure 8:
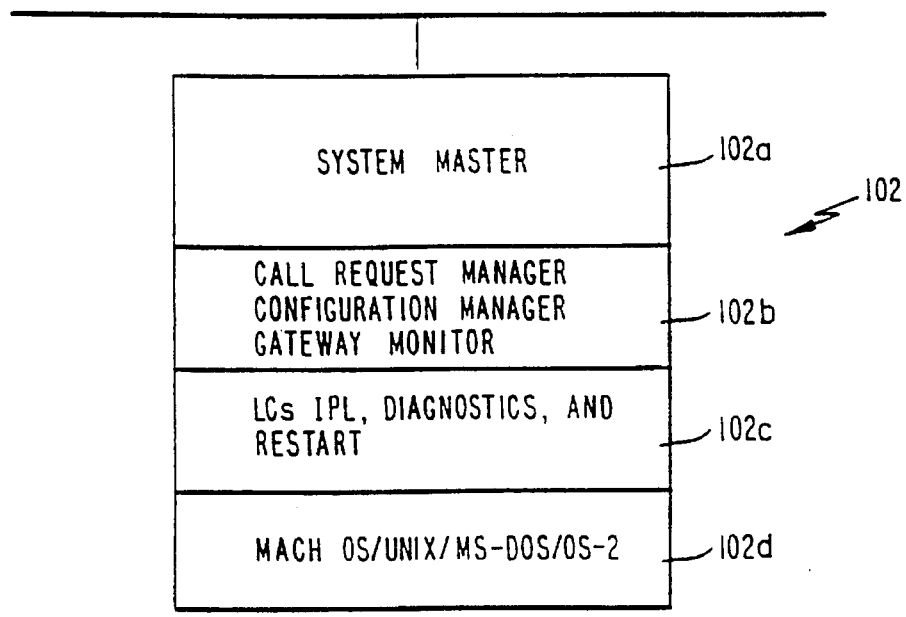
FIG. 8 is a diagram of software architecture incorporated in the system master card of FIG. 7.

The software architecture of system master element 102, shown in FIG. 8, is configured with three layers of software underlying the system master 102(*b*) in a stack. The underlying layers comprise call request management, configuration management and monitoring layer 102(*b*), as well as layers 102(*c*), 102(*d*) for implementing a computing platform.

Figure 9:
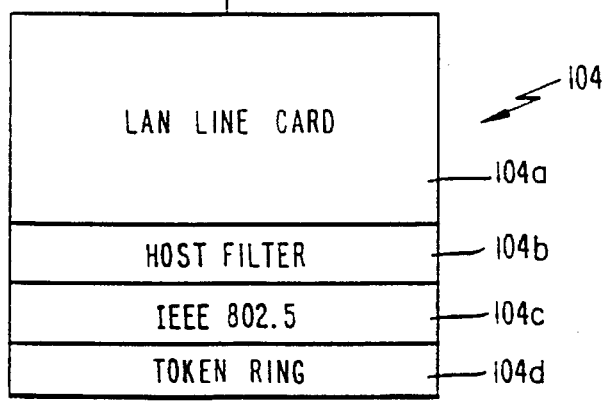
FIG. 9 is a diagram of software architecture shown in one embodiment of a LAN line card of FIG. 7.

In FIG. 9, the software architecture of one embodiment of a LAN line card (LLC) 104 for 802.5 Token Ring comprises a functional layer 104(*a*) together with a layer 104(*b*) comprising a host filter, receiving and selectively processing packets addressed to the host, as well as underlying layers 104(*c*), 104(*d*) implementing the specific IEEE 802 physical and data link protocol (802.5) for Token Ring.

Figure 10:
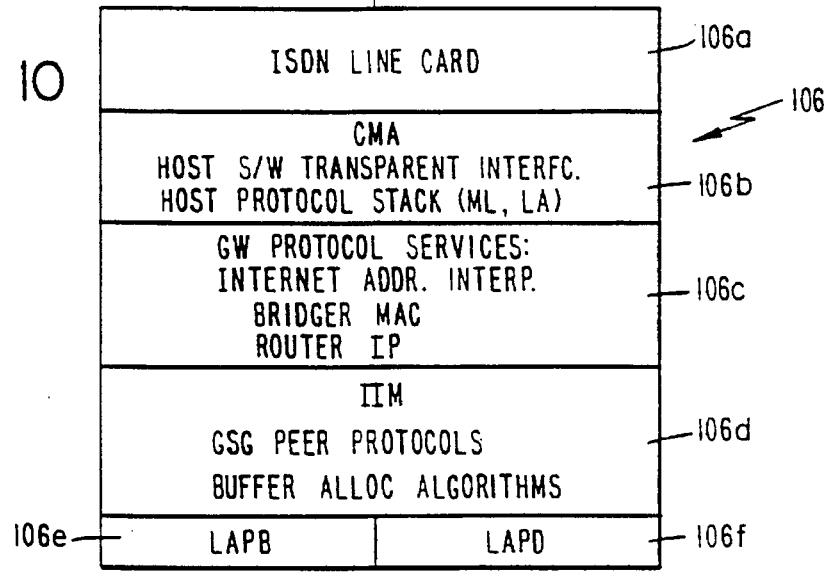
FIG. 10 is a diagram showing software architecture incorporated in an ISDN line card depicted in FIG. 7.
Figure 11:
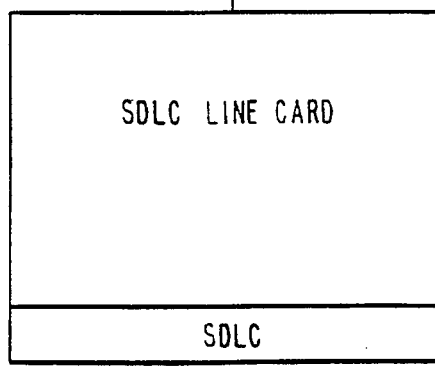
FIG. 11 is a diagram of software architecture incorporated in the SDLC line card shown in FIG. 7.

In FIG. 10, the software architecture of the ISDN line card 106 comprises a functional layer 106(*a*), together with underlying layers 106(*b*)–106(*f*) for carrying out the requirements of the OSI Reference Model layers associated with the ISDN. These layers include a communication mode adapter at layer 106(*b*) and protocol services at layer 106(*c*). Layer 106*d* (IIM) carries out router peer protocol and executing buffer allocation algorithms to be described in detail later. The peer protocols, applied on B-channels used by the router to implement train packing, compression and error handling, is also described later. FIG. 11 depicts the software architecture of the SDLC line card implementing the SNA physical and data link layers for carrying out inter-networking among hosts.

Figure 12:
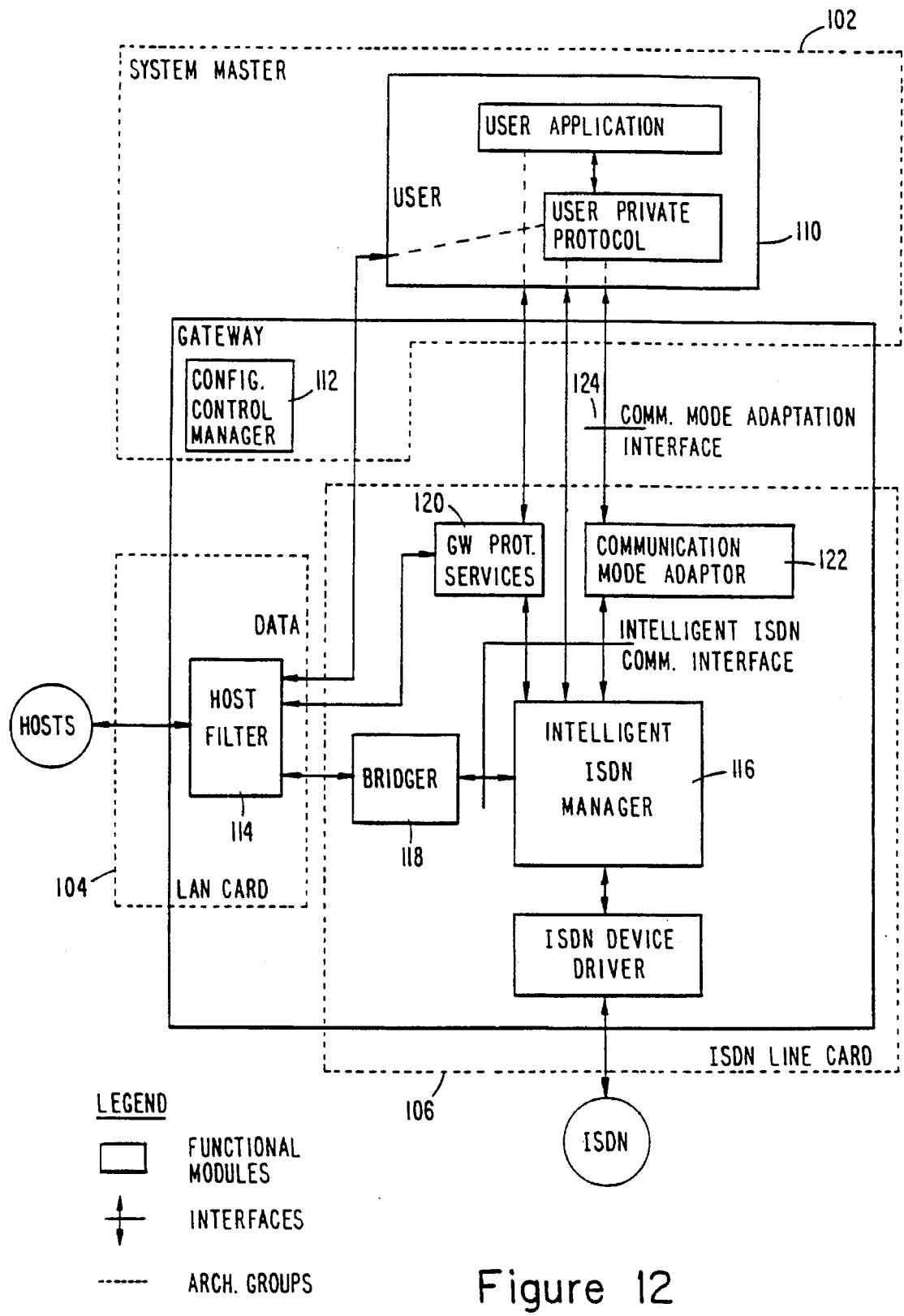
FIG. 12 is a diagram showing mapping of software to hardware component within the ISDN router.

Mapping of software architecture shown in FIGS. 8–11 to hardware components of FIG. 7 is symbolized in FIG. 12. Details are given in the copending application entitled "Dynamic Channel Allocation Method and System for Integrated Services Digital Network."

4. Terminal Resource Sharing Examples

Figure 13B:
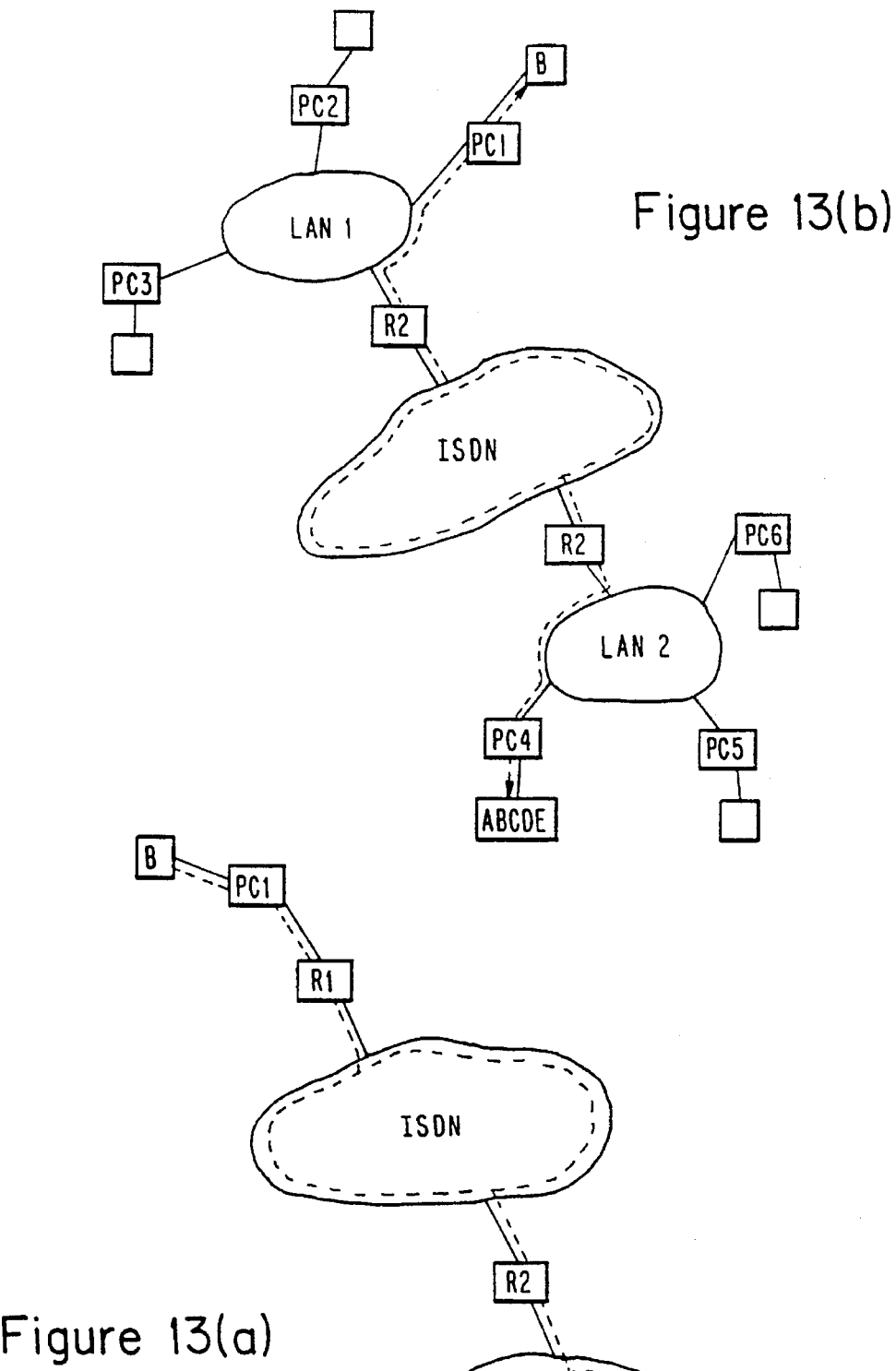
FIG. 13(*a*)–(*b*) depict examples of terminal resource sharing on the ISDN carried out in accordance with the invention.
Figure 13A:
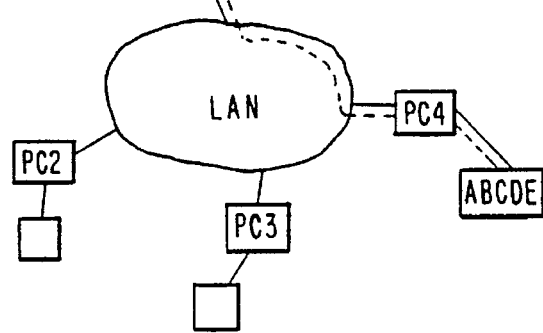

Referring to FIG. 13(a), a network comprises a LAN of computers PC having a common operating system, and a computer PC1 remote from the LAN and having the common operating system. A relay R1 of a type disclosed in the copending application entitled "ISDN Interfacing of Personal Computers" performs gateway functions between the remote computer PC1 and the ISDN, and another relay R2 of a type disclosed in the copending application entitled "ISDN Interfacing of Local Area Networks," gateways the LAN to the common ISDN line. Any operating system command by the remote computer PC1 is transmitted on the ISDN line globally to all of the computers PC in the LAN. For example, as shown in FIG. 13(a), the user of remote computer PC1 applies to the ISDN an operating system command to copy the content of hard disk ABCDE of computer PC4 on LAN to disk B of the remote computer. The operating system command undergoes protocol conversion and transfer by router R1 to the ISDN. The ISDN message then undergoes another protocol conversion and transfer to the LAN by router R2, where the command is routed to computer PC4 and disk ABCDE. The designated content of disk ABCDE is now read and transferred, via PC4, LAN, ISDN, and PC1, to disk B, undergoing necessary protocol conversions by routers R1 and R2.

In FIG. 13(b), a network includes a LAN1 comprising computers PC1-3 having a common operating system, and a LAN2 of computers PC4-6 remote from the first LAN and having the common operating system. A relay R2 of a type disclosed in the copending application entitled "ISDN Interfacing of Local Area Networks," gateways the first local area network LAN1 to the common ISDN line and another like relay R2 gateways the ISDN to the second local area network LAN2. Operating system commands on the ISDN line from one computer PC1 in LAN1 are transmitted globally to all other computers in the first and second LANs to share terminal resources.

For example, as shown in FIG. 13(b), the user of a local computer PC1 applies to LAN1 an operating system command to copy the content of hard disk ABCDE of computer PC4 on LAN2 to disk B of the local computer. The operating system command identifies the volume name of disk ABCDE, not the location of the disk in on the Network. The operating system command on LAN1 undergoes protocol conversion and transfer by router R2 to the ISDN. The ISDN message then undergoes another protocol conversion and transfer to LAN2 by router R2, where the command is routed to computer PC4 and disk ABCDE. The designated content of disk ABCDE is now read and transferred, via PC4, LAN2, ISDN, LAN1 and PC1, to disk B, undergoing necessary LAN2-ISDN and ISDN-LAN1 protocol conversions by routers R2.

Although two LANs are depicted as being connected to the ISDN in the example of FIG. 13(b), the number of LANs in practice is arbitrary. Because the operating system command is applied globally to all computers on all LANs connected to the ISDN and provided with routers R1 and R2, resource sharing is transparent to the user.

5. Dynamic Bandwidth Allocation

A further aspect of the invention involves improving bandwidth utilization of the ISDN line while sharing terminal resources. A B-channel allocation algorithm executed by routers between the terminals and the ISDN line dynamically allocates bandwidth by monitoring traffic at each destination queue and in response allocating or deallocating virtual B-channels. Bandwidth utilization is optimized by packaging data packets into trains that are transmitted to the destination when the train is completed and upon satisfaction of other conditions. Each train undergoes data compression by execution of suitable compression and correction algorithms.

More specifically, B-channel allocation, implemented by an allocation algorithm to maximize utilization of the channels, minimizes response times and the probability of losing data packets due to buffer overflow. The channel allocation algorithm, residing within the B-channel manager of IIM 116 (FIG. 12), includes commands to establish user-level connections to destinations and to send and receive data. Data passed to the IIM 116 is queued in destination queues. The channel allocation algorithm monitors the status of the destination queues, and dynamically allocates ISDN channel bandwidth to these queues. The following definitions support the channel allocation algorithm.

A "destination", which is a connection at the router level, typically coincides with a physical router. If peer protocol is compatible, all user-level connections of various types, such as virtual circuit, modem connections, LAN, packets, etc., can multiplex within the same router connection. If the peer routers are incompatible, multiple router-level connections to a single physical gateway are necessary.

Associated with each destination is a "destination queue", denoted as $Q(d)$, consisting of a pool of buffers. The pool of buffers for destination d comprises the messages destined for d. The number of buffers in $Q(d)$ is denoted as $b(d)$; it is assumed that B-channels output from or input to a buffer in parallel, with each buffer having a fixed maximum size.

A number of B-channels currently allocated to a destination B is denoted as $B(d)$. If a queue $Q(d)$ becomes too long relative to the number of channels allocated to d, an extra channel is allocated. On the other hand, if $Q(d)$ is relatively short compared to the size of $B(d)$, some channels are released. If no buffers are available for accumulation of a new train at a destination d, a "buffer fault" is created.

Events that define the length of a packet train trigger the invocation of the buffer allocation algorithm. These events comprise packet arrivals at ISDN line card 106 for transmission to the public network. There are four conditions that must be considered:

1. If a destination d is known, and $Q(d)$ contains an "open" buffer, that is, a buffer that is not filled to the maximum length, the packet is accumulated into the train.
2. If the destination d is known, but no "open" buffer is available in $Q(d)$, a new buffer is created and a new train is started.
3. If the destination d is known, but an "open" buffer is about to fill up, the packet is accumulated in the current open buffer. Thereafter, the buffer is closed to seal the train.
4. If destination d is unknown, a new buffer pool is started for a new train.

The channel allocation algorithm, in accordance with the invention, operates asynchronously to the buffer allocation algorithm described previously. As one important aspect of the invention, the channel allocation algorithm is partitioned into two components, long term allocation and short term allocation.

6. Long Term Channel Allocation

Long term allocation LTA monitors the recent historical track pattern to and from a destination, and decides upon the bandwidth and types of channels to be allocated to that destination. A short term allocation STA monitors the current size of the destination queues and the aging constraints of these queues, and decides whether to deviate, temporarily, from decisions of the long term allocation algorithm. This enables response to situations that are not well-handled by long term allocation, e,g., situations arising due to a temporary or sudden surge of traffic to certain destinations not predicted based on the long term allocation algorithm. Decisions on bandwidth allocation produced by the long term and short term allocation algorithms preferably are stored in memory, and are carried out at convenient intervals by ISDN channel processes to be described later.

Channel allocation is described with reference to B-channels, although similar allocation can be carried out for D-channels as well. In general, B-channels can be used in a circuit switched mode or in a packet switched mode. The circuit switched mode preferably is used only to transmit data between low-traffic destinations in view of the relatively high set-up tear down overhead required. The packet switched mode is preferable for transmission to destinations with a low-traffic rate if there is a moderate response time requirement. For destinations that require higher traffic rate or have more stringent response time requirements, use of B-channels in the circuit switched mode is preferable. For destinations that do not have high traffic rate but have very stringent response time requirements, the B-channels should be dedicated in the circuit switched mode and deliberately underutilized.

Figure 14:
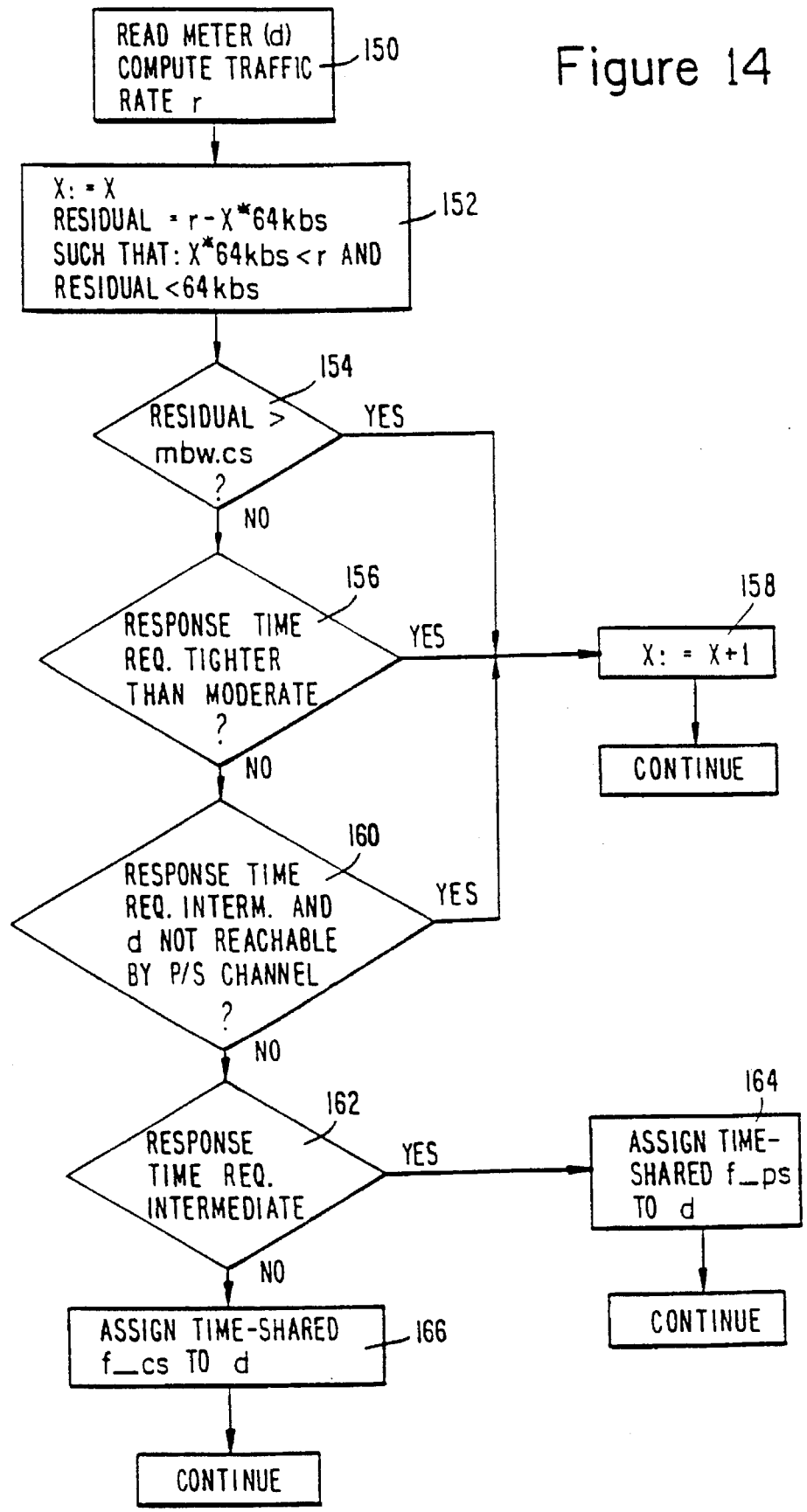
FIG. 14 is a flow chart of algorithms for carrying out LTA bandwidth allocation in accordance with an aspect of the invention.

The LTA algorithm is summarized in the flow chart of FIG. 14. The traffic rate R at each destination is monitored by a software flowmeter, which may be a counter of data quantity arriving at the destination queue within a particular interval of time. Each software flowmeter is polled at fixed intervals (w). The flowmeter is read, then reset, and the reading is used by the LTA to determine how many B-channels are to be allocated to that destination.

One embodiment of a LTA algorithm, in accordance with the invention, is as follows. Referring to FIG. 14, step 150 reads a traffic rate R for a destination d, wherein R is defined as follows.

r=Max {v_in (d, t-w, t)/w, v_out (d, t-w, t)/w},
where t is the time when the meter is read, v_in(d, t-w, t) is the accumulated input traffic volume for destination d between time t and t-w, and v_out(d, t-w, t) is that for the output queue.

In step 152, an integer x, that is greater than or equal to zero, is found such that:

x * hbw_cs≦r≦(x+1) * hbw_cs and xB channels in circuit switched mode are allocated to destination d, where hbw_cs is the achievable bandwidth once set up for a circuit switched mode B-channel. This number in practice is close to 64 Kbs.

Assuming that residual=r−x * hbw_cs, step 154 determines whether residual is greater than mbw_cs, where mbw_cs is the minimum utilization of a circuit switched B-channel, or whether the response time is more stringent than moderate (step 156). The term "moderate" is defined to be the response time that can be offered by a packet switched channel. If either condition is true, than one more B-channel is allocated to destination d (step 158).

On the other hand, if 0≦residual≦mbw_cs and the response time requirement is moderate or more relaxed than moderate, and traffic is suitable for packet switched channels, a fraction of a packet switched channel is allocated to destination d, wherein the fraction f is determined as follows.

ebw_ps=effective bandwidth of a packet switched B channel.

In step 160, if destination d is not reachable by packet switched channels, or the packet is not of a nature that is suitably transmitted through packet switched channels, and the response time requirement is very relaxed (step 162), then a fraction of a circuit switched mode channel is allocated to destination d (step 164). The fraction in this example is determined by the size of the residual. The notation used in the above algorithm is as follows.

x, f: decision variables t, r, residual: state variables ebw_ps, hbw_cw: ISDN performance profile mbw_cs, w: algorithm control parameters response time requirements for packet transmission:
   tight:≦260 ms
   moderate: between z seconds and 260 ms
   very relaxed:≦=z seconds.

In addition, the algorithm is sensitive to the transmission delay of packet switched channels and the ISDN call set-up and tear down times for circuit switched mode. The former is used to derive a boundary between moderate and tight response times. The latter is used to calculate the response times obtainable for time-shared fractional allocation of B-channels in circuit switched modes, which in turn determines the value of z which defines the boundary between moderate and very relaxed response time requirements. The basic logic of the algorithm remains unchanged under different performance profiles.

An important algorithm control parameter is the "meter window" w, which is selected such that the algorithm is sufficiently sensitive to short-term fluctuation in traffic intensity but is not too sensitive. If w is too small, a very short-termed surge in traffic may result in too many B-channels allocated and therefore will incur a high set-up tear down overhead. If w is too large, the algorithm may not be responsive enough to a short term search, resulting in a fast destination queue build-up. An excessive amount of buffer space may be consumed and response time may be degraded.

To attenuate sensitivity, a method using weighted averaging of traffic in multiple windows is provided. If a window system w with three windows w1, w2 and w3 is used, with weights wt1, wt2 and wt3, where the sum of wt1–wt3 is unity, traffic rate r can be equated to R(d, t, W,) computed as follows:

R(d, W, t)–v(d, t-w1, t)/w1*wt1+v(d, t-w1-w2, t-w1)/w2*wt2+v(d, t-w1-w2-w3, t-w1-w2)/w3*wt3

With this generalization, to allow the algorithm to be more sensitive to short term fluctuation and less to the long term pattern, wt1 should be increased and wt3 decreased, and vice versa. Multiple counters are maintained for each destination queue using this strategy.

7. Short Term Channel Allocator

The LTA algorithm functions well in cases where there are sufficient B-channels available and decisions made by the LTA are feasible. This means that the total number of B-channels allocated by the LTA is smaller than the total number of B-channels subscribed, and sufficiently smaller such that the probability that an incoming call request finds all channels busy is very small, and further that the recent past history in fact represents a good basis for allocation. When such conditions are not met, the STA algorithm must be implemented.

In general, STA makes decisions which override, temporarily, decisions made by LTA. Channel processes, described hereinafter, implement decisions made by LTA under normal circumstances. When a B-channel is just "freed" from servicing an input and output buffer, the B-channel process checks to see if a decision has been made to deallocate channels from the destination d. If so, it deallocates itself and finds a new destination for which a decision has been made by LTA to have additional channels allocated. However, when unusual conditions are detected, such as a destination queue being ignored for too long, or a B-channel process encountering an empty destination queue, self-adjustment may be performed by the B-channel process to execute decisions rendered by STA. Two examples to which STA responds are (1) if any buffer in the destination queue d is found to exceed an age limit, or (2) if the following quantity exceeds a relative queue size limit:

$$\frac{\sum_k T_k(d_i)}{B(d_i)} \qquad (3)$$

Where:

$T_k(d_i)$=size of kth train for the ith destination

B $(d_i)$=no. of B-channels i assigned to the ith destination

The above relationship is satisfied when the quantity of data in all trains to a particular destination exceeds the number of B-channels assigned to that destination.

Figure 15:
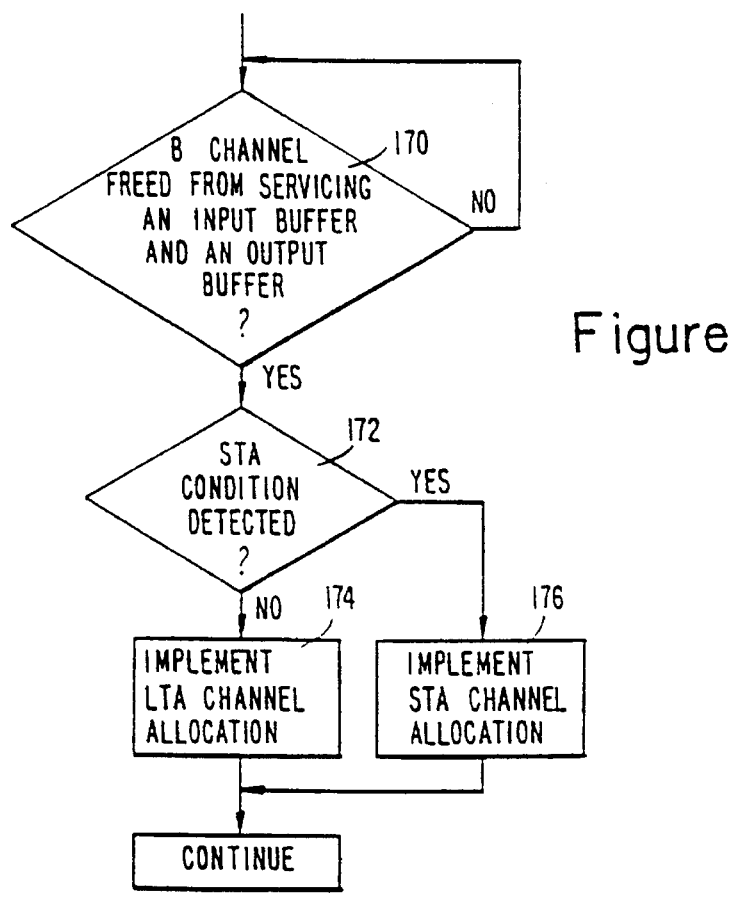
FIG. 15 is a flow chart of algorithms for selecting between LTA and STA channel allocation.

Logic implementing execution of the STA is shown in FIG. 15, wherein step 170 waits until a B-channel is freed from servicing in the input buffer and the output buffer, and then waits for an STA condition, such as the two conditions previously described, to be detected (step 172). LTA is implemented in step 174 unless the STA condition is detected. In response to an STA condition, STA channel allocation is carried out in step 176, and the process continues.

8. B-Channel Processes

Figure 16:
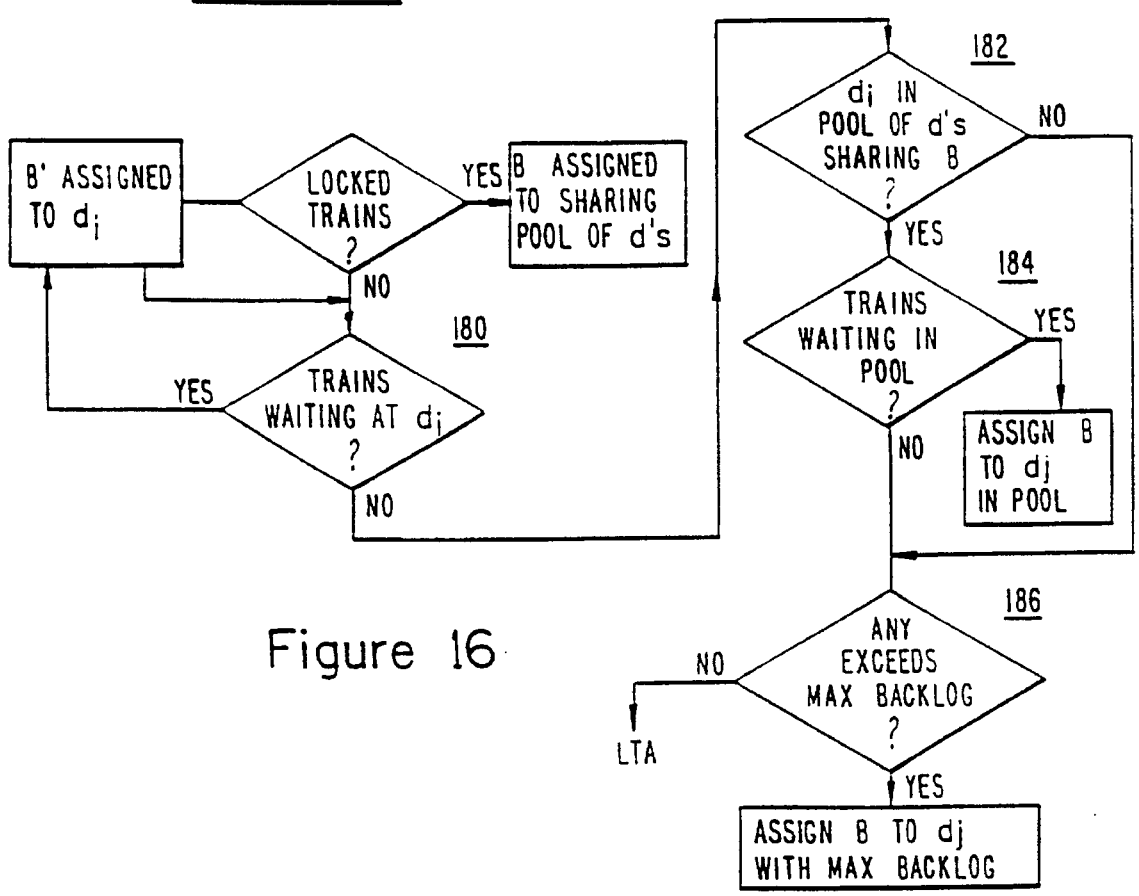
FIG. 16 is a flow chart of channel processes responding to decisions made by both the LTA and STA channel allocation algorithms.
Figure 17:
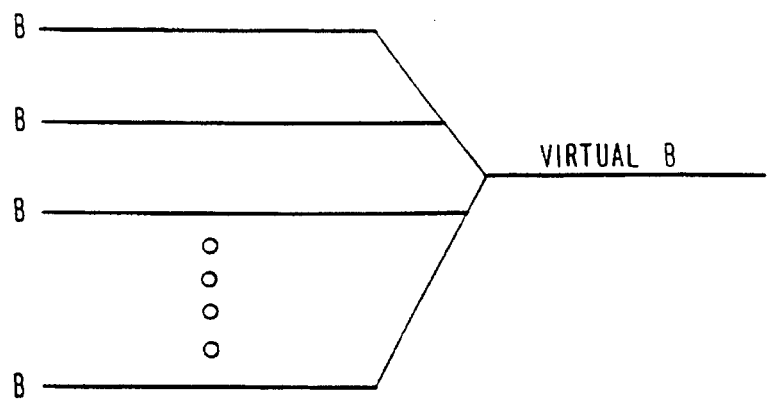
FIG. 17 is a diagram showing development of a virtual B-channel and its components.

An important aspect of the invention involves the B-channel processes which respond to decisions made by both the LTA and STA. Referring to FIG. 16, channel process invocation is triggered in response to end of train transmission on any B-channel for input or output traffic. There are three different cases for reallocating a recently freed B-channel to release an emptied buffer to a free buffer pool:

1. The first part of the channel process algorithm at 180 prevents locking out trains associated with low traffic rate destinations, or locking out incoming call requests. Executing lockout prevention at the first part of the algorithm eliminates possibility of lockout. Since this part of the algorithm tends to disturb stable allocations of B-channels to high intensity traffic streams, probability of invocation preferably is modulated inversely to the number of B-channels assigned to the destination associated with the just freed B-channel.

The probability of invocation is higher if the B-channel is allocated fractionally to a high number of distinct destinations. Probability of invocation is lower if more B-channels have been allocated to the same destination. In other words, the higher the traffic rate for a destination d, the lower the probability of causing a "wild" deallocation of one of its B-channels to handle for locked out trains.

Sealed trains are time stamped. A check is made by STA over the entire buffer pool for all destinations to see if there are trains whose age exceeds a predetermined age limit. If any are found, absence of B-channels allocated to their destinations are checked to confirm that trains are truly locked out. If such a flag is found, the just freed B-channel is associated to all respective destinations, originating fractional allocations of B-channels, the oldest locked out train is selected and transmitted. A condition wherein the age limit is set at a sufficiently high level, and if overall traffic does not exceed the capacity of the gateway is very rare. This condition must be rare to avoid thrashing in the allocation of B-channels, and must be handled as the first priority decision to avoid blocking trains associated with very low packet rates.

2. If any complete train is waiting for a transmission to the same destination, in step 182 of the flow chart, the B-channel is re-used to transmit it. Giving priority to the same destination re-use of the B-channel minimizes ISDN call overhead.

3. If no complete train is waiting for transmission toward the same destination, step 184, two subcases are considered. In the first subcase, the just freed B-channel is fractionally allocated to n destinations. The remaining n-1 destinations are checked for waiting trains, and if one is found the channel is assigned to it for transmittal. This allows maintenance of "stable" pools of low traffic rate destinations. If none are found, the following second subcase is executed. If no complete train is waiting for destination d_sub_i, Flag_Queue_Size is checked, and if set, a new destination d_sub_j is computed as the one which contains the largest relative queue size. Thereafter, the channel process remains with decisions made by LTA.

9. Data Compression

Another aspect of the invention provides data compression of packet trains, such as implementation of algorithms based on run-length encoding and Huffman encoding, and variations of Lempel-Ziv algorithms. Run-length encoding refers to replacement of sequences of identical source elements by a triple consisting of a special code indicating a "run" of elements, a count of the run length and the repeated element. Huffman encoding translates fixed-sized source elements into variable-sized codes, where the size of the output code and bits is approximately the logarithm of the probability of the source element. For some kinds of data, the probabilities of elements are well known and fixed translation tables are available. In more general cases, where the distribution of source elements is not known, a translation table can be computed for a sum block of input data, and transferred along with the data to allow decompression. This requires two passes over the input during compression; table size must be significantly smaller than the data blocks.

The Lempel-Ziv algorithms convert variable-sized input elements, or strings, into fixed-sized codes. Allowing long input sequences gives the possibility for higher compression ratios than are possible with fixed-size source element algorithms, such as Huffman encoding. The Lempel-Ziv algorithms are adaptive in that translation tables are built dynamically to reflect characteristics of the input, but require only a single pass during encoding. Decompression can be performed by dynamically building the same translation tables as were used during compression, using information implicit in the encoded data stream such as whether a particular code has been encountered.

The typical ranges of compression ratios of a compression algorithm selected to compress packet trains vary from unity for certain kinds of inherently random data such as floating point data or previously compressed data, to eight for some data bases containing large amounts of redundant or null data. The average compression ratios over mixed input types depends on the chosen samples, but ratios of between two and four for fairly large samples of mixed input found on real computer systems are common; two is proposed as an example in the preferred embodiment.

Error detection and correction, as a surrounding protocol on compressed data to allow non-delivery of corrupted blocks, is required since any errors lead to catastrophic corruption of the rest of the packet train. ISDN error rates appear to be similar to LAN error rates. No additional error handling mechanisms are required above those that already exist in LAN software. The D-channel has built-in error protection by virtue of using the HDLC protocol which includes error detection, packet sequencing and re-transmission.

Figure 18:
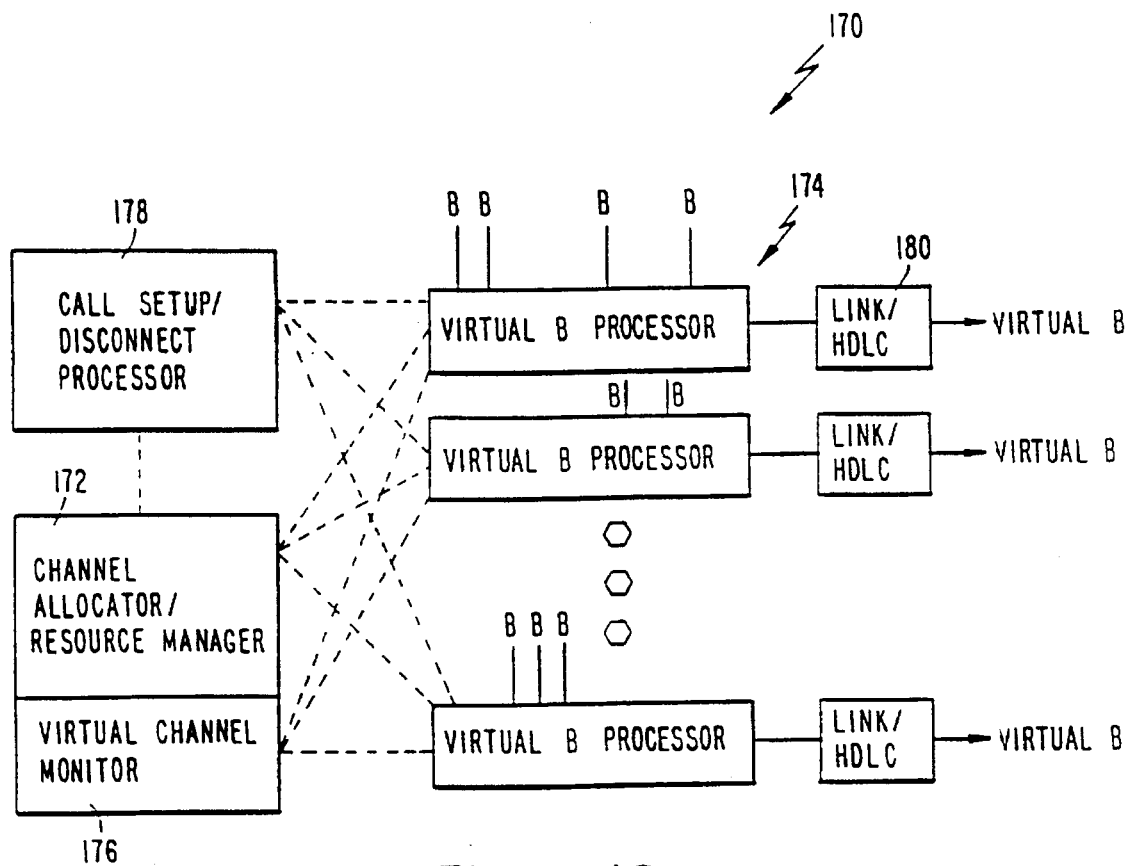
FIG. 18 is a diagram of components for carrying out LTA channel allocation in accordance with another aspect of the invention.
Figure 19:
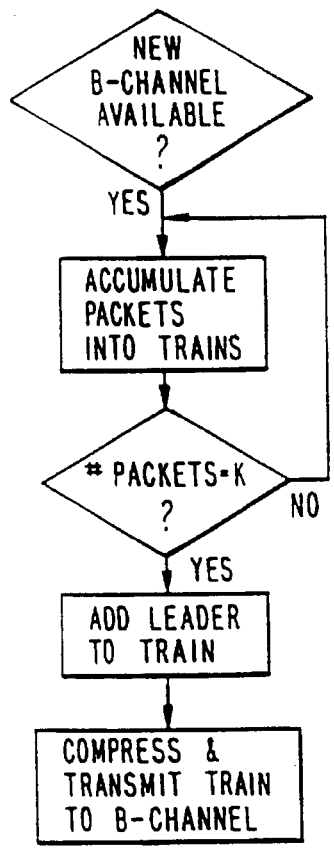
FIG. 19 is a flow chart describing assembly and compression of packet trains for transmission to a new B-channel.
Figure 20:
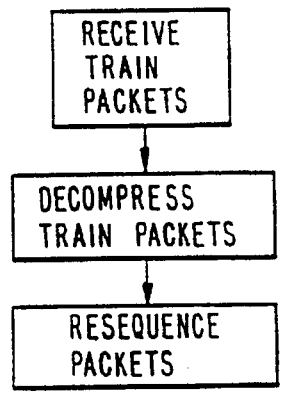
FIG. 20 is a flow chart showing reception, decompression and reseqencing of packets.
Figure 21A:
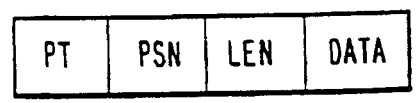
FIGS. 21*a* and 21*b* are diagrams respectively of a packet and a data frame.
Figure 21B:
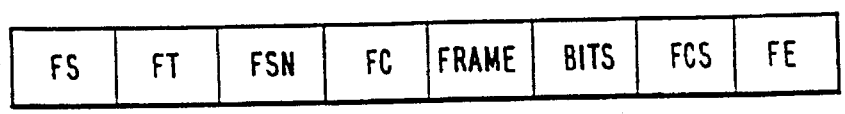
Figure 22:
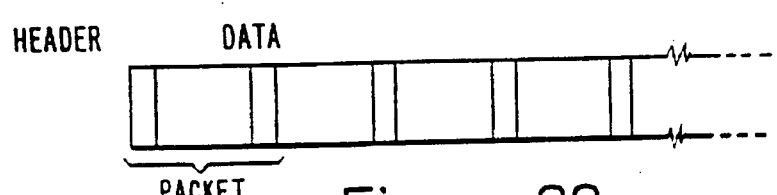
FIG. 22 depicts a train of packets in accordance with a further aspect of the invention.

In accordance with an aspect of the invention, shown in FIG. 18, a controller 170 comprises a virtual B Allocator/Resource Manager 172 which opens a virtual B-channel with control attributes in table I, below, from the B-channel pool as requested. Manager 172 also assigns a virtual B processor 174 implemented from among a plurality of such processors, and handles related supporting global resources. The virtual B processors 174 at run time or initialization time provide the service of transparent addition and deletion of new or existing component channels in its virtual B-channel based on virtual B attributes. The processors 174 further provide transparent multiplexing of client data. Virtual B-channel monitor 176 carries out traffic and error monitoring of all virtual B-channels. Data traffic flow and allocation, day allocation and replacement of channels to dynamically alter bandwidth are performed by the monitor 176.

Call set-up/disconnect processor 178 sets up and disconnects protocol on the D-channel. Processor 178 interfaces to B-channel hardware to transform the B-channel call set-up or disconnect, and interfaces with the virtual B processors 174, resource manager 172 and client. HDLC/LAPD links 180 provide the variable links for clients, and are optional.

Component channels allocated for a virtual B-channel have the following four defined states: activated, deactivated, transient and steady. In the deactivated state, data transfer is forbidden although control protocol exchange is not. Component channels allocated or joined are initially in the deactivated state. A channel, deactivated for a sender immediately following the deactive_b command, described later, is queued for transmission. For a receiver, a channel is deactivated immediately after the command is received. Only a bi-directionally deactivated channel is removed and physically disconnected from the virtual channel of which it was a member.

In the activated state, both data and control protocol transfer are permitted. A channel is activated to a sender only after acknowledgement of the active_b command transmitted is received. For a receiver, a channel is activated immediately after this command is received.

The transient state is defined by guarding periods before acknowledgements are received from the far-end. A virtual channel is transient when any component channels are transient. No data can be sent over a channel in the transient state.

A component channel is in the steady state if it is not in the transient state, that is, if it is activated or deactivated. A virtual channel is in the steady state if all its components are in the steady state.

A virtual B-channel is operative in two multiplexing modes, restricted mode and forced load-balancing mode. In the restricted mode, data received for transmission is sequentially distributed, one packet at a time, in a round-robin fashion over the steady activated component channels; deactivated channels are skipped. The far-end virtual B processor 174 receives and recovers data in the same round-robin sequence. In the load-balancing mode of operation, the distribution for transmissions over the channels follows a protocol of most-empty-channel-first for transmission. The receiver recovers it by the global sequence numbers by scanning, comparing and carrying out trace-back time-out presentation. During either distribution process, active_b commands, described below, are sent in-line on the deactivated component channels. For component channels to be deactivated, deactive_b commands are sent in-line over these channels in place of the data in the sequence. Time-fill SYNC_vB packets may be sent over channels in the restricted mode of operation to avoid "holes" in the data stream, and further can be used for time control in the load-balancing mode of operation.

10. Control and Multiplexing

The following are the command categories and their detailed format with bit definitions. This protocol assumes the use of flow control to be optional, at least to some degree, depending on the implementation and environment. In the restricted mode, this can be controlled by client link level protocol; outstanding transmissions preferably should not result in difference of twenty-six generations or more between the receiving and the far-end transmitting loop. The load-balancing mode has the same format except that all the numbered command category header-bytes described below will be two bytes in length.

* DATA

Ossnnnnn: one byte as header of client's data for transmit.

* RQST_Bs

101nnnnn: one byte header of one or multiple control bytes. The first control byte can further specify explicitly whether it is global. If it does not specify, it depends on the address bytes which follow. No address byte for the in-band operation is required, and multiple address bytes imply the in-band line is not explicitly included. The explicit global commands have the leftmost bit on, followed by explicitly specified address bytes. If the leftmost two bits are both on, it is a broadcast, and no address bytes follow. Multiple bytes are useful for off-band control. At present, only one byte of in-band control is employed. The leftmost third bit is reserved, and the fourth bit is for system control point specification. These are external or internal indicated by E and I respectively as follows. The last four bits define the commands of this category. At present, these are: DEACTIV_Bs group: uwx1z, w bit is reserved and u defines two system points.

---

DEACTIV_Bs group: uwx1z, w bit is reserved and u defines two system points.
    DEL_Bs - (0x00 ¦ 0), an external delete command
    DEX_Bs - (DEL_Bs ¦ 1), an DEL_Bs, followed by external setup
    DIL_Bs - (DEL_Bs ¦ 0x10), internally initiated delete command
    DIX_Bs - (DEX_Bs ¦ 0x10), DIL_Bs, followed by internal setup
ACTIV_Bs group: uwx0z, w bit is reserved, u the same as defined above.
    ADD_Bs - (0x00 ¦ 2), an external add command.
    AID_Bs - (ADD_Bs ¦ 0x10), an internally initiated ADD_Bs
* SYNC_vB
110nnnnn: one byte only, used for time-fill and synchronization.
* RA_Bs
111nnnnn: one byte header, followed by no or multiple

-continued optional bytes. This is an acceptance acknowledge in reply to a RQST_Bs, and in-band is implied if no other bytes follow. Similar to the case in RQST_Bs, the first by which follows can further specify whether it is global. The leftmost two bits have exactly the same meanings, which describe the scope of the possible further succeeding address bytes. The leftmost third bit, if on, turns the whole meaning of the response into a negative acknowledgement, instead. The last five bits are the same as for RQST_Bs.

* MODE_vB
1000000m: for virtual channel operation and format specification. THis has two members, MODE_rst with m = 0 and MODE_lbc with m = 1; MODE_rst defines the nnnnn five bit generation number in restricted mode. In the load-balancing mode, it handshakes with MODE_lbc, with thirteen (13) bits global sequence numbers, when opening a virtual B. The attributes of Table I to follow after these headers are optional. The mode negotiation can proceed only when all component channels are in deactivated states, or UNA will be received. if the optional attributes are not accepted, UNA will also be received. A REJ will be received if the remote end does not support or will not accept this request. In addition to this role of mode negotiations, MODE_vB resets the generation number or the global sequence number for transmitter and the corresponding variable back to 0 to restart and resets the transmitter and receiver (loop) pointers back to the first component position.

* RR
10000010: Informs the far-end receiver that this end is ready.
*
10000011: Informs the far-end receiver that his end is not ready.

* ATTRB_vB
100000100: The parameters in Table I follow this for far-end negotiation.

* UA
10010000: This unnumbered positive response means acceptance in the mode negotiation. The same MODE_vB packet will be sent back as bi-direction initialization, following the UA. The UA is also used for acknowledgement to flow control commands RR and RNR. It is used for acceptance acknowledgement to ATTRB_vB as well as unnumbered commands.

* UNA
10010100: a negative response for refusing, used similarly to UA.

* REJ
10011100: as explained in the MODE_vB description.

All these unnumbered are in-band, although MODE_vB is for global. The "nnnnn" is a module 32 correlation generation number, or a zero based global sequence number, assigned to each round of transmissions in restricted mode of operation, or assigned and incremented by one for each numbered transmission in the load balanced mode. The "ss" in the DATA command, which has four values 11, 10, 01 and 11, is for frame segmentation.

Processing of these commands is independent of their arriving timing phase with respect to other channels, once dequeued. The sequence numbers are for data synchronization across the component channels. A receiver variable "nr", used for synchronization, is incremented by one after each round, or each actual numbered reception. This is a recovery process corresponding to the far-end sender's sequence number increment for each round, or each data or numbered command transmission.

Once mode negotiation is done, sequence number comparison is then started. The selected virtual B processor 174 polls the receiving queue and then steps to the next component channel. In restricted mode, if nothing arrives in the queue of an activated channel, the processor stays and waits indefinitely. In the case of MAC implementation, the processor waits indefinitely or steps after a time out period if a trace-back timer has been started, regardless of the channel states. At a deactivated component channel, the processor hunts through all following contiguous deactivated channels for any arrival, and does trace-back get, steps or stays until the trace-back timer expires, if arrival time inversion is found. The time-fill SYNC_vB commands are to be received over their preceding channels, if no other commands or data are available through these channels. The receptions in load-balancing mode are always in hunting mode, across the full range of component channels. The processor continues looking for the correct sequence number for presentation. Trace-back time-out presentation scheme applies in either mode.

Parameters which characterize a virtual B-channel to be opened and used to monitor the channel hereinafter are listed in Table I.

TABLE I

Virtual B Channel Attributes (in C language representation)

```
typedef struct {
    long    err_threshold;          /* one out of err_threshold frames */
    short   err_action_thres;       /* act on contig err_action_thres */
    short   err_action_permit;      /* allow deactivation of errored channel */
    short   max_band_width;         /* max allowed bandwidth */
    short   high_util_thres;        /* high effective % band width threshold */
    short   high_busy_util_thres;   /* one high util out of high_busy_util */
    short   high_action_thres;      /* act on contig high_busy_util_thres */
    short   high_action_permit;     /* allow bandwidth increment actions */
    short   min_band_width;         /* minimum allowed bandwidth */
    short   low_util_thres;         /* low effective % bandwidth threshold */
    short   low_busy_util_thres;    /* one low util out of low_busy_util */
    short   low_action_thres;       /* act on contig low_busy_util_thres */
    short   low_action_permit;      /* allow bandwidth decrement actions */
    short   set_up_retry_thres;     /* max contig retry before giving up */
    short   no_action_thres;        /* no action threshold time */
} VB_THRESHOLD;
```

11. Traffic Sensing

Sensing of traffic for automatic control of bandwidth is carried out as follows. Assuming that the sampling rate is one sample every two seconds, the maximum bandwidth of the virtual channel opened is set to be five B-channels, definition of the high_util thres is 75%, of a high_busy_ util_thres is 5, the high action_thres is ten and the initial channel opened is one B-channel (64 Kbps). As transmission rate increases steadily from an original effective rate of 45 Kbps to 55 Kbps, a procedure for adding a new line is automatically initiated thirty seconds later. This assumes that the high_action_permit is true. A new element channel is added and the new line utilization will be 42.3% if traffic is maintained at 55 Kbps. An increase in input data rate thus drives up bandwidth growth. If the input data rate continues to increase, the bandwidth eventually will reach five B-channels as a maximum.

When traffic decreases, assuming that the low_util thres is 30%, and the low busy_util_thres and low action_thres are five and ten, respectively, no line will be deleted from the virtual B if a pattern of the driving traffic does not have a utilization of less than 30% in any continuous ten seconds or there is no consecutive repeating ten or more times. If the low action_permit is false, no reduction in virtual B-channels is permitted. The attributes of the virtual B thus define the bandwidth control behavior.

If line error rate is above a predefined threshold rate for a predetermined period of time, line replacement operations are reduced in addition to bandwidth control.

12. Conclusion

The invention provides user transparent sharing of terminal resources distributed on an ISDN in response to operating system commands issued from any terminal and transmitted globally on the Network. Bandwidth utilization during information transfer between terminals is optimized by carrying out dynamic B-channel allocation in response to traffic directed to each destination on the Network. Packets of data are transmitted on the Network from each terminal in packet "trains" rather than as individual packets. The trains are compressed using a suitable compression algorithm.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. A network, comprising:

a plurality of computers having a common operating system;

means for interfacing said computers to a common ISDN line;

means for transmitting on said common ISDN line an operating system command globally to all of said computers;

means for detecting on said ISDN line a queue of messages destined for a predetermined terminal; and means responsive to said queue for dynamically allocating B-channels interactively with the network to the predetermined terminal, extra B-channels being added to allocated B-channels when the queue increases, and some of the allocated B-channels being released when the queue decreases, wherein said channel allocating means deallocates the extra B-channels from a first destination to allocate them to a second destination, when the queue to the first destination decreases and the queue to the second destination increases.

2. The network of claim 1, wherein said B-channel allocation means includes means for establishing input and output destination queues corresponding to said terminals;

data flowmeter means for measuring quantity of data arriving at each said input and output destination queue during a particular time interval;

means for polling each said data flowmeter means at fixed intervals;

long term channel allocation means responsive to said polling means for allocating or deallocating transmission channels to a particular destination on said medium depending upon data flow traffic to said destination and particular channel parameters; and short term channel allocation means, overriding said long term channel allocation means in response to predetermined conditions, for allocating or deallocating transmission channels on said medium.

3. The network of claim 2, including means for assembling pluralities of packets into trains, each consisting of a predetermined number of packets, and means for transmitting said trains onto said medium.

4. The network of claim 3, including means for compressing said trains prior to transmission thereof onto said medium.

5. The network of claim 1, wherein said queue of messages is established in a pool of buffers, and said B-channels are allocated asynchronously to allocation of said buffers.

6. A network, comprising:

a plurality of computers having associated resources and a common operating system;

means for interfacing said computers to a common ISDN line;

means for transmitting on said common ISDN line an operating system command globally to all of said computers for accessing said resources;

means for detecting on said ISDN lines a queue of messages destined for a predetermined terminal; and means responsive to said queue for dynamically allocating B-channels interactively with the network to the predetermined terminal, extra B-channels being added to allocated B-channels when the queue increases, and some of the allocated B-channels being released when the queue decreases, wherein said channel allocating means deallocates the extra B-channels from a first destination to allocate them to a second destination, when the queue to the first destination decreases and the queue to the second destination increases.

7. The network of claim 6, wherein said B-channel allocation means includes means for establishing input and output destination queues corresponding to said terminals;

data flowmeter means for measuring quantity of data arriving at each said input and output destination queue during a particular time interval;

means for polling each said data flowmeter means at fixed intervals;

long term channel allocation means responsive to said polling means for allocating or deallocating transmission channels to a particular destination on said medium depending upon data flow traffic to said destination and particular channel parameters; and short term channel allocation means, overriding said long term channel allocation means in response to predetermined conditions, for allocating or deallocating transmission channels on said medium.

8. The network of claim 7, including means for assembling pluralities of packets into trains, each consisting of a predetermined number of packets, and means for transmitting said trains onto said medium.

9. The network of claim 8, including means for compressing said trains prior to transmission thereof onto said medium.

10. The network of claim 6, wherein said queue of messages is established in a pool of buffers, and said B-channels are allocated asynchronously to allocation of said buffers.

11. A network, comprising:

a first local area network comprising a plurality of computers having a common operating system:

a second local area network remote from said first local area network comprising a plurality of computers having said common operating system;

means for interfacing said first and second local area networks to a common ISDN line;

means for transmitting an operating system command on said ISDN line from one computer on said first local area network globally to all other of said computers in said first and second local area networks;

means for detecting on said ISDN line a queue of messages destined for a predetermined terminal; and means responsive to said queue for dynamically allocating B-channels interactively with the network to the predetermined terminal, extra B-channels being added to allocated B-channels when the queue increases, and some of the allocated B-channels being released when the queue decreases, wherein slid channel allocating means deallocates the extra B-channels from a first destination to allocate them to a second destination, when the queue to the first destination decreases and the queue to the second destination increases.

12. The network of claim 11, wherein said B-channel allocation means includes means for establishing input and output destination queues corresponding to said terminals;

data flowmeter means for measuring quantity of data arriving at each said input and output destination queue during a particular time interval;

means for polling each said data flowmeter means at fixed intervals;

long term channel allocation means responsive to said polling means for allocating or deallocating transmission channels to a particular destination on said medium depending upon data flow traffic to said destination and particular channel parameters; and short term channel allocation means, overriding said long term channel allocation means in response to predetermined conditions, for allocating or deallocating transmission channels on said medium.

13. The network of claim 12, including means for assembling pluralities of packets into trains, each consisting of a predetermined number of packets, and means for transmitting said trains onto said medium.

14. The network of claim 13, including means for compressing said trains prior to transmission thereof onto said medium.

15. The network of claim 11, wherein said queue of messages is established in a pool of buffers, and said B-channels are allocated asynchronously to allocation of said buffers.

16. A network, comprising:

a local area network comprising a plurality of computers having a common operating system;

a computer remote from said local area network and having said common operating system;

means for interfacing said remote computer and said local area network to a common ISDN line;

means for transmitting an operating system command on said ISDN line from said remote computer globally to all of said computers in said local area network;

means for detecting on said ISDN line a queue of messages destined for a predetermined terminal; and means responsive to said queue for dynamically allocating B-channels interactively with the network to the predetermined terminal, extra B-channels being added to allocated B-channels when the queue increases, and some of the allocated B-channels being released when the queue decreases, wherein said channel allocating means deallocates the extra B-channels from a first destination to allocate them to a second destination, when the queue to the first destination decreases and the queue to the second destination increases.

17. The network of claim 16, wherein said B-channel allocation means includes means for establishing input and output destination queues corresponding to said terminals;

data flowmeter means for measuring quantity of data arriving at each said input and output destination queue during a particular time interval;

means for polling each said data flowmeter means at fixed intervals;

long term channel allocation means responsive to said polling means for allocating or deallocating transmission channels to a particular destination on said medium depending upon data flow traffic to said destination and particular channel parameters; and short term channel allocation means, overriding said long term channel allocation means in response to predetermined conditions, for allocating or deallocating transmission channels on said medium.

18. The network of claim 17, including means for assembling pluralities of packets into trains, each consisting of a predetermined number of packets, and means for transmitting said trains onto said medium.

19. The network of claim 18, including means for compressing said trains prior to transmission thereof onto said medium.

20. The network of claim 16, wherein said queue of messages is established in a pool of buffers, and said B-channels are allocated asynchronously to allocation of said buffers.

21. A network, comprising:

a plurality of computers each having at least one data storage disk;

means for interfacing said computers to a common ISDN line;

means for transmitting on said common ISDN line an operating system command from one of said computers globally to all others of said computers for accessing data storage disks thereof;

means for detecting on said ISDN line a queue of messages destined for a predetermined terminal; and means responsive to said traffic for dynamically allocating B-channels interactively with the network to the predetermined terminal, extra B-channels being added to allocated B-channels when the queue increases, and some of the allocated B-channels being released when the queue decreases, wherein said channel allocating means deallocates the extra B-channel from a first destination to allocate them to a second destination, when the queue to the first destination decreases and the queue to the second destination increases.

22. The network of claim 21, wherein said B-channel allocation means includes means for establishing input and output destination queues corresponding to said terminals;

data flowmeter means for measuring quantity of data arriving at each said input and output destination queue during a particular time interval;

means for polling each said data flowmeter means at fixed intervals;

long term channel allocation means responsive to said polling means for allocating or deallocating transmission channels to a particular destination on said medium depending upon data flow traffic to said destination and particular channel parameters; and short term channel allocation means, overriding said long term channel allocation means in response to predetermined conditions, for allocating or deallocating transmission channels on said medium.

23. The network of claim 22, including means for assembling pluralities of packets into trains, each consisting of a predetermined number of packets, and means for transmitting said trains onto said medium.

24. The network of claim 23, including means for compressing said trains prior to transmission thereof onto said medium.

25. The network of claim 21, wherein said queue of messages is established in a pool of buffers, and said B-channels are allocated asynchronously to allocation of said buffers.

26. A network, comprising:

a plurality of computers each having at least one data storage disk having a unique name;

means for interfacing said computers to a common ISDN line;

means for accessing a selected data storage disk for a particular one of said computers by transmitting on said common ISDN line an operating system command including the unique name of said selected disk, from said particular one of said computers globally to all others of said computers;

means for detecting on said ISDN line a queue of messages destined for a predetermined terminal; and means responsive to said queue for dynamically allocating B-channels interactively with the network to the predetermined terminal, extra B-channels being added to allocated B-channels when the queue increases, and some of the allocated B-channels being released when the queue decreases, wherein said channel allocating means deallocates the extra B-channels from a first destination to allocate them to a second destination, when the queue to the first destination decreases and the queue to the second destination increases.

27. The network of claim 26, wherein said B-channel allocation means includes means for establishing input and output destination queues corresponding to said terminals;

data flowmeter means for measuring quantity of data arriving at each said input and output destination queue during a particular time interval;

means for polling each said data flowmeter means at fixed intervals;

long term channel allocation means responsive to said polling means for allocating or deallocating transmission channels to a particular destination on said medium depending upon data flow traffic to said destination and particular channel parameters; and short term channel allocation means, overriding said long term channel allocation means in response to predetermined conditions, for allocating or deallocating transmission channels on said medium.

28. The network of claim 27, including means for assembling pluralities of packets into trains, each consisting of a predetermined number of packets, and means for transmitting said trains onto said medium.

29. The network of claim 28, including means for compressing said trains prior to transmission thereof onto said medium.

30. The network of claim 26, wherein said queue of messages is established in a pool of buffers, and said B-channels are allocated asynchronously to allocation of said buffers.

* * * * *